Figure 1:
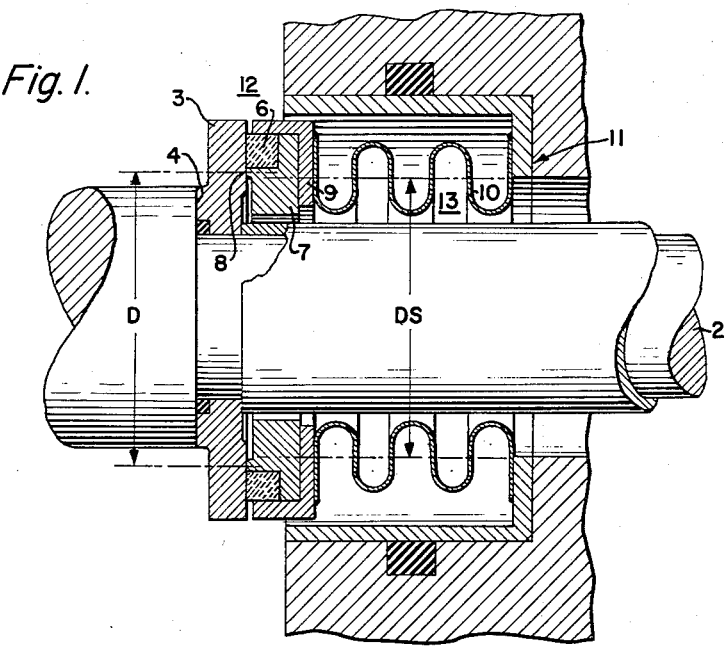

United States Patent Office 3,122,375
Patented Feb. 25, 1964

3,122,375
DYNAMIC FLUID SEAL
Harold A. Greenwald, Los Angeles, Calif., assignor to The Garrett Corporation, Los Angeles, Calif., a corporation of California
Filed Nov. 1, 1960, Ser. No. 66,592
4 Claims. (Cl. 277—88)

This invention relates to dynamic fluid seals, and is particularly concerned with face type fluid seals, wherein a relatively nonporous annular sealing member, having a small area and radial dimension in relation to the entire rubbing surface, is utilized. An annular member composed of relatively porous material is maintained in juxtaposition with the nonporous sealing member so that lubricant, if available, may be absorbed, and the sealing surface may be supplied with lubrication independent of a continuous supply of lubrication from external sources. Where no lubricant is available, the porous member acts solely as a bearing surface.

One of the most important characteristics of a dynamic fluid seal is long service life or durability, with minimum wear over long periods of operation. This characteristic is particularly difficult to obtain where the fluid seal is used in high speed machines. Actual contact, or near zero clearance of the seal face at all areas not in actual contact with a mating member, must be maintained with minimum force in order to obtain long life for the seal. With fluid seals known prior to this invention, variations in the effective diameter of the primary sealing surface, and/or variations in the effective diameter of a secondary seal, had to be compensated for by increasing the force exerted upon the primary sealing surface in order to maintain an efficient and effective seal. When an increased force was exerted upon the primary sealing surface, more wear and shorter life for the sealing members resulted. If the force was reduced in order to decrease sealing surface wear, the fluid seal then became less efficient as a seal, and therefore not effective. Frequently production tolerances or wear caused changes in the effective diameters of the sealing surfaces which affected the initial pressure balance sufficiently to cause separation of the primary sealing surfaces.

The primary seal of this invention may consist of either a stationary or a rotating sealing member which contacts a rotating or stationary mating member. Since irregularities occurring in the surfaces of these two mating members cannot be completely eliminated, it is usually not possible to obtain an accurate determination of the effective diameter of the sealing surface. Also, where a bellows, or like member, is utilized as a secondary seal, differences in this member due to variations in metal, welds, configuration, the effect of pressure causing distortion, and the like, make it virtually impossible to accurately determine the effective diameter of the secondary seal. The effective diameters of both the primary seal surface and the secondary seal are known to vary within certain ranges. The limits of the variations are affected by the accuracy and uniformity of manufacture and by subsequent wear.

In accordance with this invention variations in the effective diameter of the primary sealing surface are maintained within a very narrow range. Also, compensation for variations in the effective diameter of a secondary seal member is provided for by the seal of this invention. Since the effective diameter of the primary sealing surface is maintained within a very narrow range, the force exerted upon the sealing surfaces may be kept low. Thus, the dynamic fluid seal of this invention provides for reduced wear and long life, combined with good lubrication characteristics where required, even when used in high speed machines.

An important object of this invention is to provide a nonporous sealing member having a small area and radial dimension in relation to the entire rubbing surface, so that the effective diameter of the nonporous sealing member may be maintained within a very narrow range.

Another object of the invention is to provide an annular member composed of relatively porous material on the high pressure side of the primary seal so that lubricant may be absorbed, and the porous member act as a bearing surface and reservoir supplying lubricant to a fluid sealing surface under conditions when lubrication would otherwise be inadequate.

Another object of the invention is to provide a sealing ring member composed of a relatively dense, nonporous material so as to form a bearing surface which will prevent loss of the fluid it is desired to seal, and which may be supplied with lubricant by a relatively porous ring member.

Another object of the invention is to provide a bearing surface formed by a seal ring and a porous ring which together have a bearing area large enough to permit the use of relatively high spring load with easily maintained tolerances and still obtain a low bearing pressure.

That these and other objects and advantages of the invention are attained will be readily apparent from a consideration of the following description when taken in conjunction with the drawings.

The preferred embodiment of the invention is illustrated in the accompanying drawings, in which FIGURE 1 is an axial section through the dynamic fluid seal associated with a rotating shaft.

Figure 2:
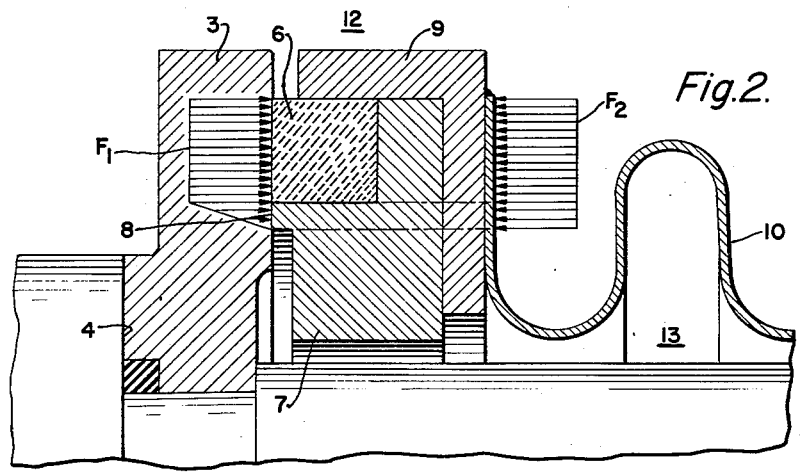

FIGURE 2 is an explanatory diagrammatic view of the relationship between the forces acting on the dynamic fluid sealing surface.

Referring to FIGURE 1, shaft 2 has mounted upon one of its ends a rotating mating ring 3 which may be made integral with the shaft, or fixed thereto by well known means. The location of mating ring 3 is determined by the position of a mounting shoulder 4.

Concentric sealing ring members 6 and 7, in juxtaposition, form a coplanar end face which abuts the exposed end face of mating ring 3, so as to provide a fluid sealing surface 8. Sealing ring member 6 is composed of a relatively porous substance which may be, for example, a graphite or ceramic material. The material of sealing ring 7 is a dense and relatively nonporous composition, such as a relatively nonporous grade graphite, ceramic or other suitable material. The area of ring member 6 contacting mating ring 3 is large in comparison with the area of ring member 7 which contacts mating ring 3.

A cylindrical retaining shell 9 is provided to enclose the end of ring member 7 opposite sealing surface 8. Retaining shell 9 also encloses the outer cylindrical surface formed by ring members 6 and 7.

Abutting cylindrical retaining shell 9 is a secondary seal 10. The secondary seal 10 is a resilient member, such as a bellows, which exerts a spring force in a direction axially of the shaft on mating ring 3. The end of secondary seal 10, opposite retaining shell 9, abuts the outer surface of seal housing 11. The opposite ends of the secondary seal 10 are secured to the retaining shell 9 and the seal housing 11 by welding, or other well known means, to prevent leakage at these locations. The force exerted by secondary seal 10 maintains ring members 6 and 7 in contact with mating ring 3, thereby establishing an effective fluid seal between the high pressure fluid area 12 and the low pressure fluid area 13.

Lubrication may be supplied to porous ring member 6, and ring member 6 then acts as a reservoir supplying lubrication to nonporous ring member 7, even when the external supply of lubrication is inadequate.

The contacting surfaces of mating ring 3 and ring members 6 and 7 must be very flat and smooth. These surfaces are commonly held to a flatness of less than three helium light bands as measured with an optical instrument.

In the case of a typical face type seal for a rotating shaft in which the dynamic sealing surfaces are perpendicular to the axis of rotation, it is apparent that to achieve long life with minimum wear, the rotating mating ring and stationary seal face must be kept together with as light a load as possible. The seal should be nearly balanced from a pressure standpoint, but preferably slightly unbalanced in the direction tending to keep the relatively moving surfaces together. To accomplish this, when the high pressure area is as shown in FIGURE 1, the effective diameter D of the primary sealing surface should be slightly larger than the effective diameter $Ds$ of the secondary seal. As shown in FIGURE 2 the resultant force $F_1$, created by fluid in the high pressure area 12, acts in a direction tending to separate the sealing surfaces. The force $F_2$, created by the secondary sealing member 10, tends to maintain the sealing surfaces in contact to establish an effective seal. The magnitude of force $F_1$ decreases in the direction of low pressure area 13. Thus, it can be seen that a condition of unbalance in regard to the forces acting on the sealing surface may exist. However, as can be seen from FIGURE 2, when the effective diameter D of the primary sealing surface is maintained slightly larger than the effective diameter $Ds$ of the secondary seal, the condition of unbalance will be greater in the direction tending to maintain the sealing surfaces in contact and thus establish an effective dynamic fluid seal. Conversely, if area 13 were the high pressure area, for example, member 7 would be located adjacent area 12. Then in order to establish a condition of unbalance tending to maintain the sealing surfaces in contact, the effective diameter D of the primary sealing surface would be maintained slightly less than the effective diameter $Ds$ of the secondary seal. The resultant axial force of forces $F_1$ and $F_2$ may be kept very low, thus insuring long service life for the fluid seal. Further, although the fluid sealing member 7 has a small area in relation to the entire rubbing surface, the combined bearing area of members 7 and 6 is large. Therefore, a low bearing pressure between the rubbing surfaces is maintained by this fluid seal.

Face type seals, of the kind disclosed herein, are difficult to make in a manner which will insure consistent values for D and $Ds$ as defined above. Thus, either of these values may vary, and the spring effect from a bellows, for example, which is the resilient means normally provided, must be sufficiently strong to exert a force which prevents possible separation caused by excessively unbalanced forces which may act to separate the mating seal surfaces. This condition frequently results in higher than necessary bearing pressure between the mating ring and the seal face, which causes rapid wear, and/or excessive heating from friction. On the other hand, if too light a force is used, the mating surfaces sometimes may separate during transient off-design fluid pressure conditions.

In order to achieve consistency in production, when tolerances cause parts to vary, to obtain consistent sealing effectiveness and to provide improved lubrication of the sealing surface, the seal face of this invention utilizes two ring members. Where the higher fluid pressure to be sealed is in an area exterior to the shaft, the inner ring should be composed of a dense, nonporous material, and a relatively porous material is used for the outer ring. Where the fluid pressure to be sealed is adjacent the shaft, or at the inside diameter of the seal, the porous sealing ring should be nearest the center line of the shaft and the nonporous sealing ring on the exterior or low pressure side of the fluid seal.

The porous ring transmits pressure through its pores, and does not act as an effective seal. The nonporous sealing ring acts as the effective seal. The nonporous sealing ring is made relatively narrow radially in relation to the porous sealing ring. Thus, variations in the effective diameter of the nonporous sealing ring may be kept within a very narrow range.

The porous sealing ring can be made wide enough so that its bearing area, together with that of the nonporous sealing ring is large enough to permit use of a relatively high spring load and/or greater pressure unbalance, with easily maintained tolerances of the effective diameters of both the primary and secondary seal members and still obtain a low bearing pressure between the stationary and moving surfaces.

The structure of the dynamic fluid seal of this invention permits attainment of more consistent and better sealing performance since this structure provides for improved lubrication, when required, better control of effective seal diameter D with lower bearing pressure and higher spring forces than is possible in face type fluid seals known previously to this invention. Also, since the effective diameter of the secondary seal may vary with deflection pressure, configuration, and the like, compensation can be made by higher axial loads from pressure and/or spring forces possible with the fluid seal of this invention while still maintaining a low bearing pressure.

This invention may be used for face type seals where the seal rubbing surfaces are either in a plane perpendicular to the axis of rotation, or in a plane parallel or cylindrical to the axis of rotation, as in the case of "circumferential" seals. Also, the seal of this invention may be utilized to effect fluid sealing between reciprocating members.

It will be apparent to those skilled in the art that the novel principles of the invention disclosed herein will suggest various other modifications and applications of the same. It is accordingly desired that the present invention shall not be limited to the specific embodiment thereof described herein.

Having thus described my invention, I claim:

1. A rotary dynamic shaft seal of low bearing pressure for establishing a fluid seal between an external high pressure zone and an internal low pressure zone, which seal comprises in combination:

a first load bearing sealing member which forms a first smooth contacting surface;

a second load bearing sealing member which is a mate for said first load bearing member and is composed of a relatively nonporous dense load bearing component mounted on the low pressure side of said seal and a porous load bearing component mounted on the high pressure side of said seal and in open communication with said high pressure zone, said relatively nonporous component being juxtaposed radially inwardly from said porous component to form a second smooth contacting surface of said fluid seal, said second contacting surface being adapted to move relative to said first contacting surface;

said nonporous component of said second load bearing member being further characterized in being mounted to bear continuously against said first contacting surface and in having a small load bearing area in relation to the entire second contacting surface so that the effective diameter of said nonporous component may be maintained within a small limited range; and a substantially constant pressure means for urging said two contacting surfaces together, said constant pressure means having an effective diameter less than the effective diameter of said nonporous component of said second load bearing member whereby the pressure between said two contacting surfaces is slightly unbalanced so that said first load bearing member and said nonporous component of said second load bearing member are kept together continuously in a load bearing and fluid sealing relationship while in relative motion with respect to each other.

2. A seal according to claim 1 wherein said nonporous component is composed of relatively nonporous graphite and said porous component is composed of relatively porous graphite.

3. A seal according to claim 1 wherein the flatness of said two contacting surfaces is less than three helium light bands.

4. A rotary dynamic shaft seal of low bearing pressure for establishing a fluid seal between an internal high pressure zone and an external low pressure zone, which seal comprises in combination:

a first load bearing sealing member which forms a first smooth contacting surface;

a second load bearing sealing member which is a mate for said first load bearing member and is composed of a relatively nonporous dense load bearing component mounted on the low pressure side of said seal and a porous load bearing component mounted on the high pressure side of said seal and in open communication with said high pressure zone, said relatively nonporous component being juxtaposed radially outwardly from said porous component to form a second smooth contacting surface of said fluid seal, said second contacting surface being adapted to move relative to said first contacting surface;

said nonporous component of said second load bearing member being further characterized in being mounted to bear continuously against said first contacting surface and in having a small load bearing area in relation to the entire second contacting surface so that the effective diameter of said nonporous component may be maintained within a small limited range; and a substantially constant pressure means for urging said two contacting surfaces together, said constant pressure means having an effective diameter greater than the effective diameter of said nonporous component of said second load bearing member whereby the pressure between said two contacting surfaces is slightly unbalanced so that said first load bearing member and said nonporous component of said second load bearing member are kept together continuously in a load bearing and fluid sealing relationship while in relative motion with respect to each other.

References Cited in the file of this patent

UNITED STATES PATENTS 2,598,484     Adams _____ May 27, 1952

FOREIGN PATENTS 518,339     Great Britain _____ Feb. 23, 1940
598,846     Great Britain _____ Feb. 27, 1948
1,094,465     France _____ May 20, 1955